Nov. 2, 1954 M. KUTS 2,693,236
APPARATUS FOR ACCURATELY FEEDING AND CUTTING
FLEXIBLE TUBING INTO PREDETERMINED LENGTHS
Filed Feb. 28, 1952 4 Sheets-Sheet 4

Inventor
Mathew Kuts
By Dwight L. Moody
Atty

United States Patent Office 2,693,236
Patented Nov. 2, 1954

2,693,236

APPARATUS FOR ACCURATELY FEEDING AND CUTTING FLEXIBLE TUBING INTO PREDETERMINED LENGTHS

Mathew Kuts, Akron, Ohio, assignor to The B. F. Goodrich Company, New York, N. Y., a corporation of New York Application February 28, 1952, Serial No. 273,879

12 Claims. (Cl. 164—76)

The invention relates to apparatus for automatically cutting solid or hollow flexible strips into pieces of determinate length and is useful especially for cutting strips of hose, thin-walled tubing of small diameter and other hollow bodies of reinforced or unreinforced elastic rubber, natural or synthetic, or other rubber-like material.

Heretofore, it has been customary to use a fixed position, hand-operated cutter to manually cut strips of flexible rubber hose or tubing into pieces of desired length while the hose or tubing in a tensioned condition is held by hand and supported on the flat top surface of a table. The hose or tubing having only line contact with the table top surface tends to roll, flex and bend during the cutting operation making it difficult to secure regular or square-cut ends, thereby slowing down the cutting operation. Also, difficulty has been encountered in obtaining uniformity of length of the cut pieces, because manually advancing the hose or tubing in the tensioned condition to the desired extent beyond the cutting position, is not only slow but generally results in objectionable variation in length of the cut pieces.

For these and other reasons, the problem is presented in commercial production of cutting flexible hose or tubing into pieces having uniformity of length and regular or square-cut ends and of providing a high number of cut pieces per hour at low cost without objectionable loss of finished hose or tubing due to irregular lengths and ends of the cut pieces.

An object of the invention is to provide for overcoming these and other difficulties of cutting flexible hose or tubing or the like into pieces of uniform length having regular or square-cut ends.

Other objects are to provide improved apparatus for automatically cutting solid or hollow strips of flexible distortable material, especially elastic rubber material, into pieces of substantially uniform length; to provide for precision cutting of one or more of the strips into pieces of substantially the same determinate length; to provide for automatically advancing one or more of the strips under little or no initial tension along a supporting surface to a determinate extent beyond a cutting position together with maintaining the strips in the little or no tensioned condition while cutting the same; to provide for positively guiding and supporting one or more of the strips upon the supporting surface so as to resist relative movement therebetween laterally and longitudinally of the strips during the advancement and cutting thereof; to provide for yieldably and continuously pressing one or more of the strips against the supporting surface in greater than line contact and in frictional contact relation therewith to resist slippage of the strips; to provide for maintaining a plurality of the strips under little or no tension in side-by-side, closely spaced, substantially parallel relation one to the other along the surface and at the cutting position; to provide for automatically feeding the plurality of closely spaced strips a determinate extent along the surface and immediately thereafter automatically cutting the strips; and to provide for accommodating various sizes of the strips together with cutting pieces of determinate length over a wide range of lengths.

Other objects are to provide for automatically cutting flexible hose or tubing of small diameter and elastic rubber, reinforced or unreinforced, into pieces each of substantially uniform length while maintaining the hose in a condition of little or no tension; to provide for automatically advancing one or more strips of flexible hose under little or no initial tension conformingly about at least part of a rotatable support surface of peripherally curved form and to a determinate extent beyond the cutting position; to provide for positively guiding the hose upon the curved support surface in a straight path extending peripherally about the surface and to provide for resisting lateral rolling and flexing and an irregular or wavy configuration of the hose while the same is supported upon the curved support surface; to provide for yieldably and continuously pressing the hose into frictional and greater than line contact with the curved support surface together with maintaining the hose in substantially its normal cross-sectional configuration, and to provide for simplicity and durability of construction, for effectiveness of operation and for a high rate of production of precision-cut pieces of hose and uniformity of product.

More specific objects are to provide for yieldably, continuously and individually pressing one or more strips of the hose or tubing into frictional contact with a circumferentially grooved cylindrical support surface adapted to be rotated; to provide for positively guiding and seating one or more of the strips of hose in the grooves of the support surface under rotation of the same and for effecting greater than line contact of the hose with the wall of the groove while resisting rolling and waviness of the hose in the groove; to provide for supporting the hose effectively at the cutting position and for automatic removal of the cut pieces; to provide for cutting a plurality of strips of hose simultaneously while individually supporting and holding each of the strips on the grooved cylindrical support surface and while maintaining substantially the normal or initial cross-sectional configuration of the strips; to provide for accommodating a range of sizes of the hose in the grooves; to provide for cutting the hose into pieces of substantially uniform length over a wide range of lengths; and to provide for rotation of the cylindrical support surface through a determinate number of degrees in rapid sequence with the cutting of the hose together with rapidity and accuracy of cutting the hose.

These and other objects and advantages of the invention will be apparent from the following description.

In the accompanying drawings which form a part of this specification and in which like numerals are employed to designate like parts throughout the same, Fig. 5 is a sectional view taken along line 5—5 of Fig. 4 showing the drum and guide means of the hold-down mechanism for guiding the hose into the grooves of the drum, parts being broken away, Fig. 6 is a sectional view in an enlarged scale taken along line 6—6 of Fig. 4 showing the drum, guide elements and V-belts of the hold-down mechanism, broken lines showing flexible hose of relatively greater diameter seated in one of the grooves, parts being broken away, Fig. 7 is a sectional view like Fig. 4 but showing a modified construction of the circumferentially grooved cylindrical drum and hold-down mechanism, parts being broken away, Fig. 8 is a sectional view like Fig. 4 but showing another modified construction of the circumferentially grooved cylindrical drum and hold-down mechanism, parts being broken away, The illustrative embodiment of the invention shown in Figs. 1 to 6 of the drawings has provision of means for automatically cutting one or more solid or hollow strips 33, 33 of flexible, distortable or extensible material, especially strips of hose or tubing of small diameter or other hollow extensible bodies of elastic, reinforced or unreinforced, natural or synthetic rubber, or other rubber-like material, into pieces of substantially uniform, determinate length having regular or square-cut ends; and has provision of means for yieldably and frictionally holding the flexible hose or tubing in substantially its normal cross-sectional shape and under little or no tension upon a rotatable supporting surface, while resisting effectively lateral rolling and longitudinal irregularity or waviness and slippage of the hose or tubing relative to the rotatable support surface during the advancement of the hose or tubing to a determinate extent about the support surface and beyond the cutting position at 52 and also during the cutting of the hose or tubing. The illustrative embodiment has provision for accommodating hose or tubing in a range of sizes such, for example, as from about ¼ inch to about ⅝ inch outside diameter and for cutting pieces having a wide range of determinate lengths such, for example, as from about ¼ inch up to 18 inches or more. Also, the illustrative embodiment is adapted to cut solid strips of elastic rubber and generally circular cross-sectional form.

The construction includes a stiff metal girder framework 15 normally mounted vertically upon a floor 16 or the like. The framework 15 may be welded or bolted together and may have a sheet metal top cover 20 and vertically spaced-apart sheet metal shelves 17, 18 and 19 of suitable strength and rigidity. The framework carries rotatable hose-supporting means 21 including yieldable hold-down means 22 for supporting and contacting a reach of each strip of hose 33, 33; indexing mechanism 23 operatively connected to the hose-supporting means 21; hose-cutter means 24 mounted for horizontal reciprocating movement; mechanism 25 operatively connected to the hose-cutter means 24 for effecting the reciprocating movement thereof; and means 26 for controlling sequential operation of the hose-supporting means 21 relative to the hose-cutter means 24.

*Hose-supporting means*

Figure 1:
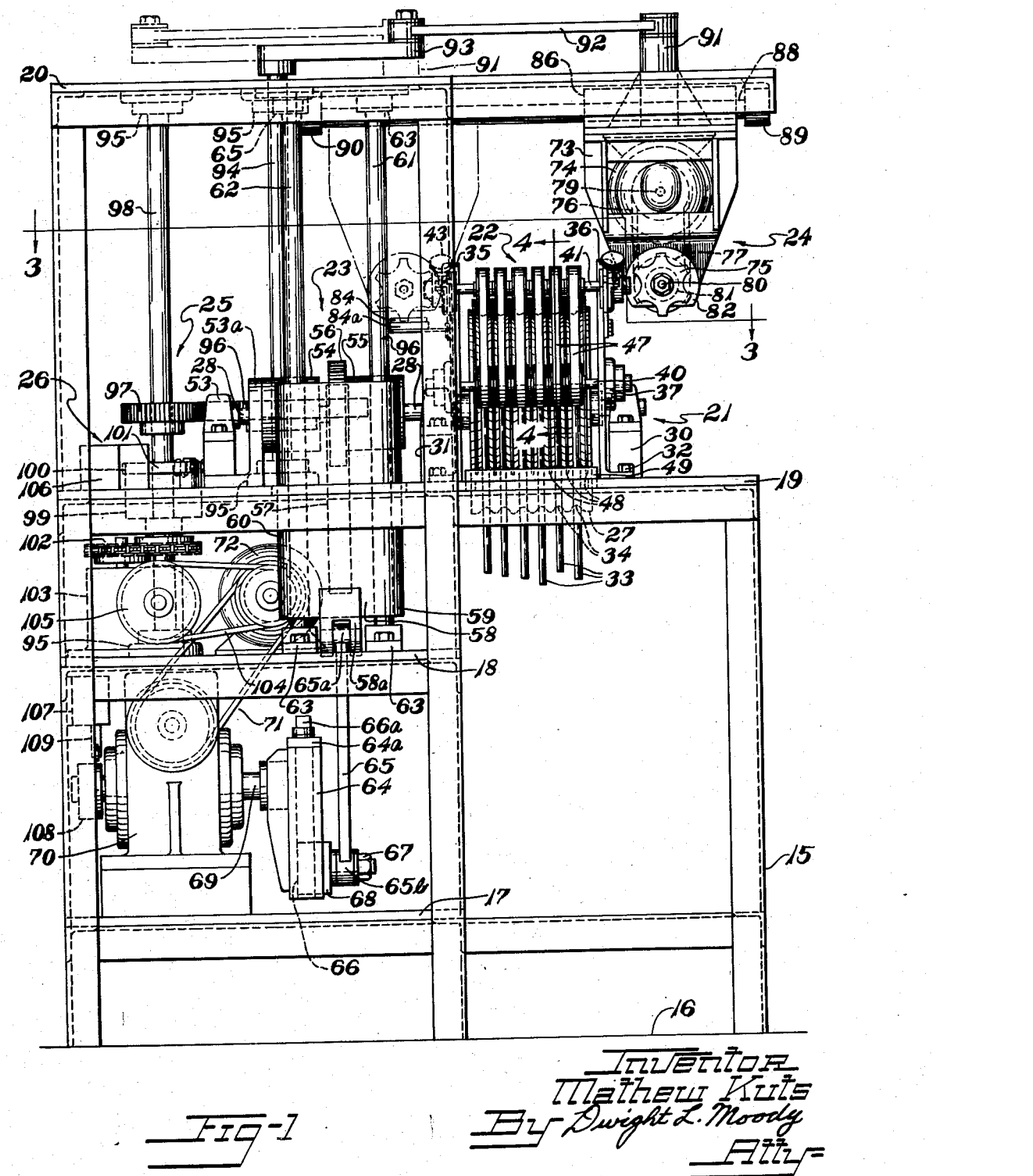
Fig. 1 is a front elevational view of apparatus for automatically cutting strips of flexible hose or tubing into pieces of determinate length, and constructed in accordance with and embodying the invention.
Figure 2:
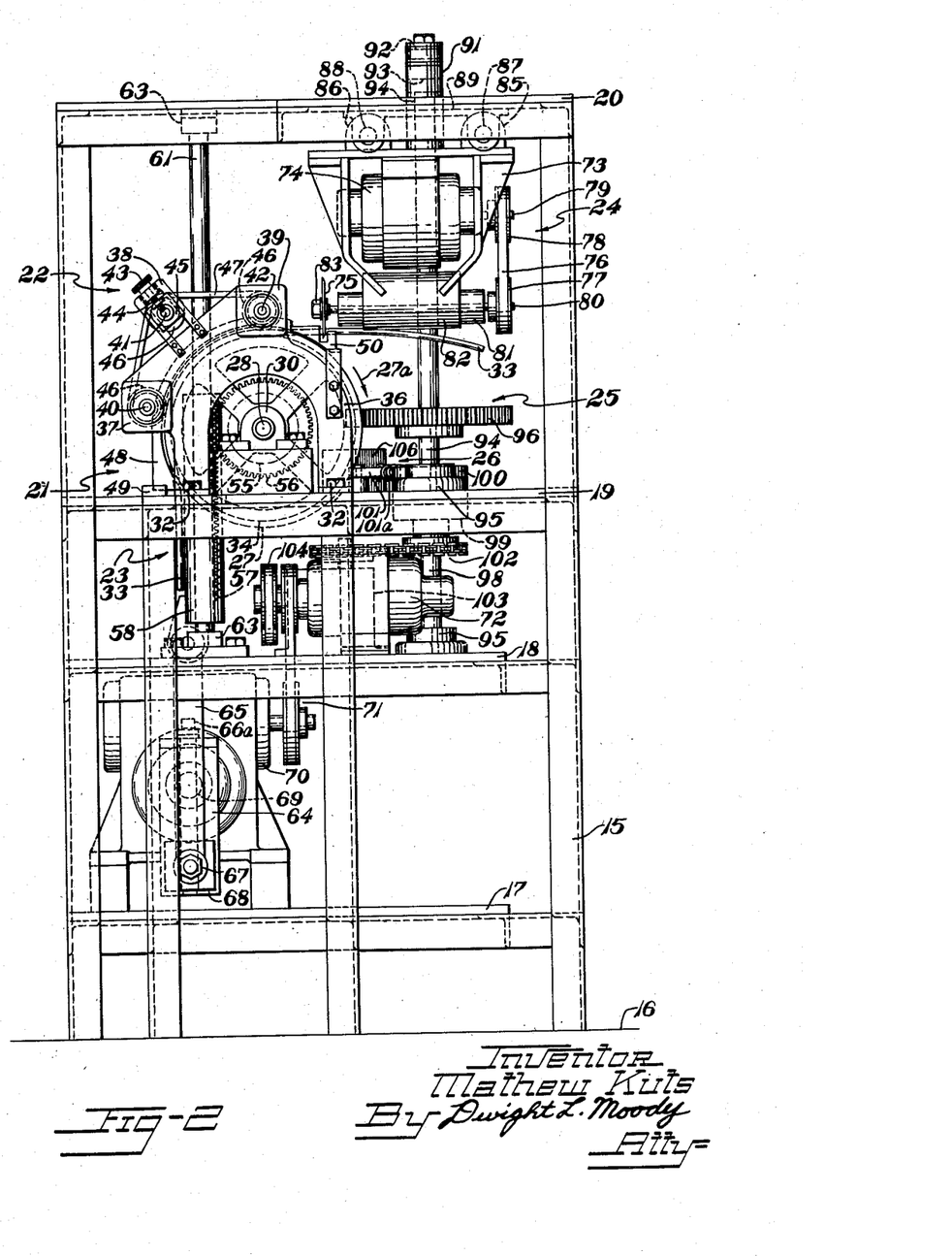
Fig. 2 is an elevational view taken from an end of the apparatus shown in Fig. 1.
Figure 3:
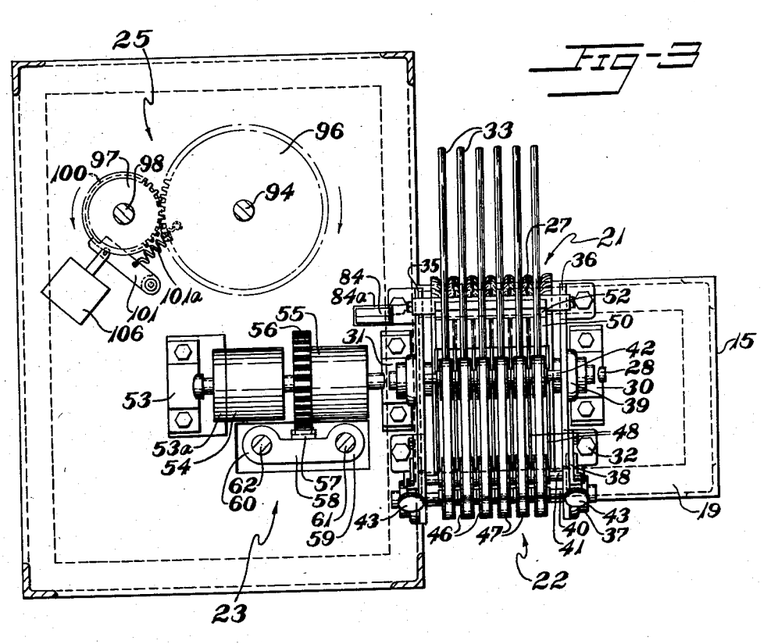
Fig. 3 is a sectional view taken along line 3—3 of Fig. 1, parts being broken away.

The hose-supporting means 21 which may be disposed at the upper shelf 19 adjacent one end of the apparatus as shown in Figs. 1, 2 and 3, has a rotatable hose-supporting surface or hollow drum 27, preferably cylindrical and circumferentially grooved and of aluminum alloy, steel or other hard metal. The drum is mounted fixedly on a horizontal drive shaft 28 as by a key 29 for rotation of the drum with the drive shaft which extends part way along and is supported horizontally at a position spaced above the shelf 19 by axially spaced-apart and aligned ball or roller bearing mountings 30, 31 of the pedestal type secured to the shelf as by bolt fasteners 32, 32. The shelf 19 is partially cut away for receiving part of the lower half of the cylindrical drum 27 and for accommodating the upward passage of a plurality of strips of hose 33, 33 in a condition of little or no initial tension to the drum.

The rotatable drum 27 has in its outer peripheral hose-supporting surface a plurality of circumferentially-extending open-faced continuous grooves 34, 34 in substantially parallel, closely adjacent relation one to the other providing circumferentially continuous spaces for receiving the plurality of strips of hose 33, 33, the walls of the drum in the grooves 34, 34 being desirably roughened as by knurling or laterally-extending shallow serrations or the like to facilitate gripping the elastic rubber material of the hose so as to resist slippage thereof whether the hose is stationary in or advancing along the grooves about the drum. Preferably, each groove 34 has the same cross-sectional configuration and width and depth dimensions sufficient to accommodate several sizes of hose.

Figures 5, 6, 7, 8:
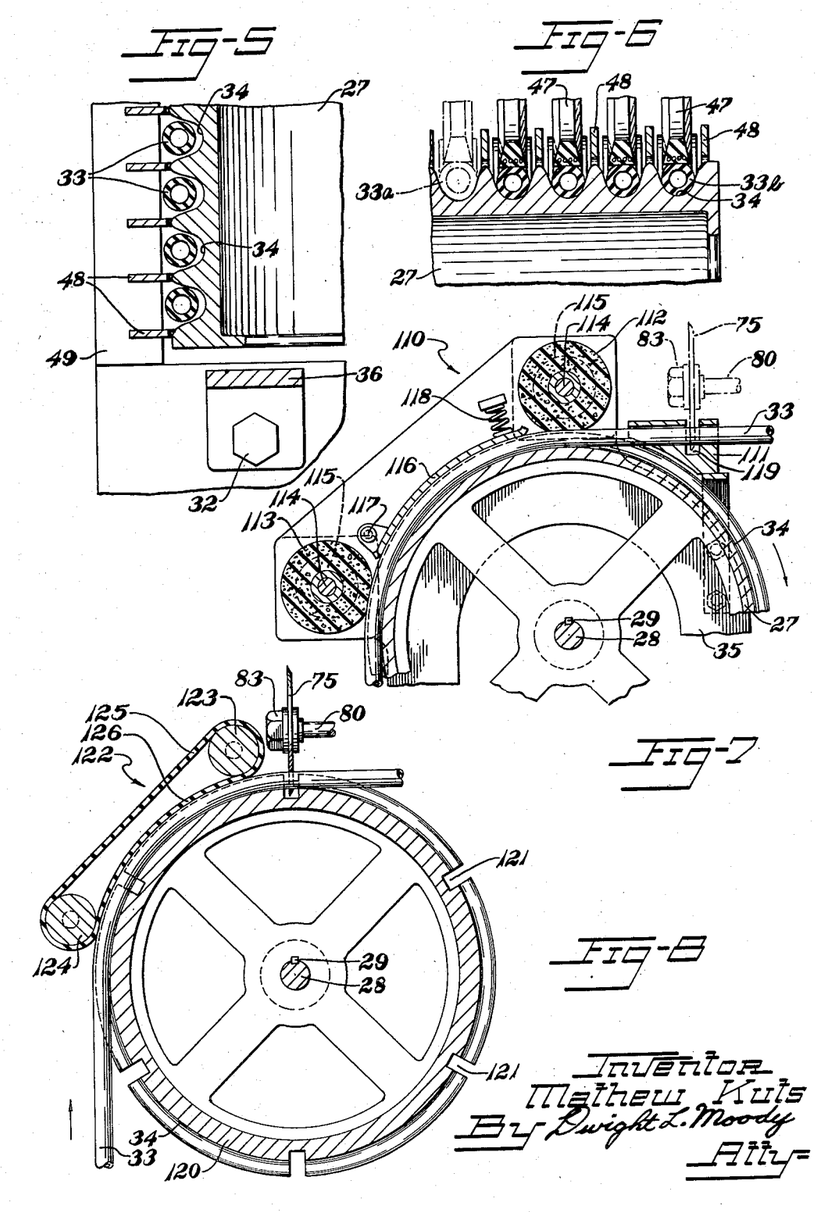

All the grooves 34, 34 are generally curved or U-shaped in cross-section, as shown especially in Figs. 5 and 6, with the bottom of the U desirably constituting approximately one-half the depth of the groove and being continuously rounded, and with the sides of the U being desirably slightly outwardly divergent relative to one another so that the included angle between the sides is, for example, about 60°.

Although the entire bottom of the U-shaped groove 34 in section may have a continuously uniform curvature corresponding to that of the outside of the maximum size hose 33a to be cut by the apparatus, good results have been obtained wherein the curvature of the lowermost part of the bottom of the U-shaped groove corresponds to that of the outside of the minimum size hose 33b and the uppermost part of the bottom of the groove corresponds to that of the outside of the maximum size hose 33a, as shown especially in full lines in Fig. 6. That is, the sharpness or rate of curvature of the lowermost region of the bottom of the groove in section is greater than that of the upper region of the bottom of the groove in section, and the two kinds of curvature merge smoothly together to constitute the continuously rounded bottom of the U-shaped groove.

If desired, the outwardly divergent sides of the U-shaped groove may be straight, but good results have been obtained with the sides slightly outwardly or laterally curved relative to one another and in smooth continuation of the curvature at the upper region of the bottom of the groove. The tops of the walls separating each pair of adjacent grooves 34, 34 are desirably rounded. Also, good results have been obtained with the overall depth of the groove being slightly less than the outside diameter of the maximum size hose 33a.

The construction of the grooves 34, 34 provides for positive support of reaches of the hose throughout a substantial width of the hose to maintain greater than line contact of the hose with the wall in the groove, thereby resisting lateral rolling and localized flexure of the reach of hose in the groove and also irregularity or waviness of the hose along the groove. The specific configuration of the grooves facilitates the entrance of the hose into the grooves with minimum interference or restriction thereto and with minimum change in the normal or initial circular sectional shape of the hose.

*Yieldable hold-down means*

Adjacent and spaced from the ends of the circumferentially grooved cylindrical drum 27 are vertically disposed end frames 35, 36 of suitable metal plate material and of inverted generally U-shaped form in plan, straddling the drive shaft 28 and secured as by suitable bolt fasteners 32, 32 to the upper shelf 19 so as to shroud the ends of the drum and to provide for mounting the yieldable hold-down means 22 in adjacent overlying relation to the frontal upper quadrant region of the circumferentially grooved outer peripheral surface of the drum. The U-shaped end frames 35, 36 each have peripherally spaced-apart axle mounting plates 37, 38 and 39 at positions within the limits of the frontal upper quadrant region of the drum, the horizontal center-line of the lower axle mounting plate 37 being desirably slightly above the horizontal plane passing through and along the longitudinal axis of the drive shaft 28, and the radially extending center-line of the upper axle mounting plate 39 being in the vertical plane passing through and along the longitudinal axis of the drive shaft 28, while the intermediate axle mounting plate 38 is approximately midway between the lower and upper axle mounting plates 37 and 39, respectively, as shown especially in Figs. 2 and 4.

The respective pairs of axle mounting plates 37, 37 and 38, 38 and 39, 39 are arranged to mount freely rotatable axles 40, 41, and 42, respectively, substantially parallel to the axis of rotation of the drum 27 and drive shaft 28. Preferably, the lower and upper axles 40 and 42, respectively, are not adjustable radially of the drum, but the intermediate axle 41 is adjustable radially of the drum for a purpose to be discussed more fully hereinafter. Accordingly, each intermediate axle mounting plate 38, 38 may have an inverted U-shaped form in plan and suitable axle adjusting means 43 such, for example, as a threaded adjusting screw 44 connected rotatively to a peripherally slotted, circular mounting element 45 slidably mounted on and between the legs of the U of the axle mounting plate 38 for radially adjusting the axle 41.

Each axle 40, 41 and 42 has a series of closely spaced V-belt pulleys 46, 46 mounted on ball bearings on the axle for independent rotation of each pulley relative to the axle. Each series of V-belt pulleys 46, 46 are aligned relative to one another circumferentially of the drum 27 so that each pulley of each series is disposed in central overlying relation to an adjacent underlying groove 34.

An endless V-belt 47 extends about each group of three, circumferentially aligned, V-belt pulleys 46, 46, 46 on the respective axles 40, 41 and 42. The upper reach of each V-belt extends from the lower pulley 46 of the group to the intermediate pulley 46 and then to the upper pulley 46 of the group. The lower reach of the V-belt 47 extends from the lower pulley 46 of the group directly to the upper pulley 46 of the group conformingly along the immediately underlying groove 34 so as to yieldably contact a reach of the hose 33, when the same is in the groove, throughout a substantial extent of the hose between the lower and the upper pulleys 46, 46 thereby coacting with the drum 27 to frictionally drive and compel advance of the hose to a determinate extent beyond the cutting position at 52. At the same time, the V-belt at its lower free-floating reach yieldably and continuously presses the hose toward and against the curved wall in the bottom of the groove 34 without objectionable flattening of the hose, thereby coacting with the drum to resist lateral rolling and waviness of the hose along the groove.

Figure 4:
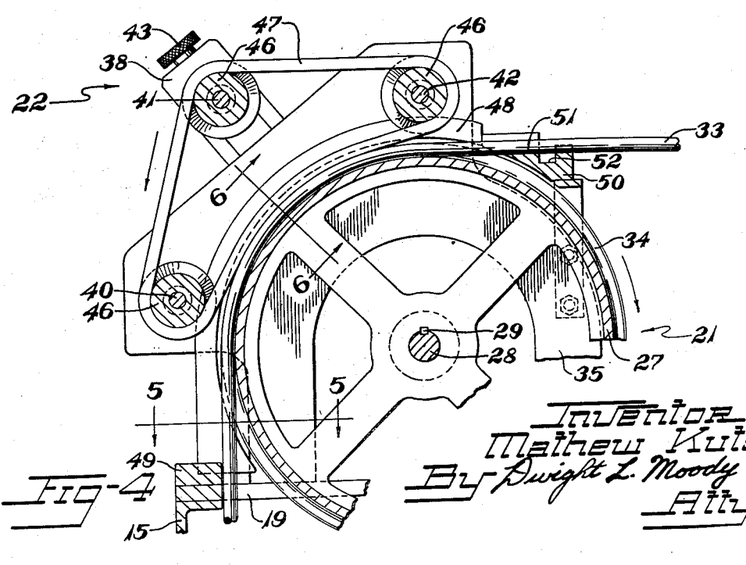
Fig. 4 is a sectional view in an enlarged scale taken along line 4—4 of Fig. 1 showing a circumferentially grooved cylindrical drum and its associated hold-down mechanism for individually and yieldably pressing the hose against the drum, parts being broken away.

The end portions of the lower reach of each V-belt 47 immediately at the lower and upper pulleys 46, 46 which are desirably spaced slightly radially outward from the drum as shown especially in Fig. 4, extend from such pulleys of each group in substantially straight paths tangent to the circumferential curvature of the groove 34 at points spaced circumferentially inward from the lower and upper pulleys. Thus, the major portion of the lower reach of the V-belt 47 extends conformingly about the groove 34 and normally has a portion of the belt disposed radially inward of the top of the groove sufficient to frictionally contact and yieldably press against hose of the minimum size 33b and also hose of the maximum size 33a without objectionable flattening thereof. The tangential arrangement of the end portions of the lower reach of each V-belt relative to the grooved drum facilitates the free entrance and egress of hose of various sizes to and from the groove and of individual strips of hose that vary locally in diameter.

It has been found that radial adjustment of the intermediate axle 41 only and the series of pulleys 46, 46 thereon (by the operation of the adjusting means 43, 44, 45) makes feasible tensioning each V-belt 47, 47 sufficiently to compel the major portion of the lower reach of each V-belt to yieldably, that is lightly and resiliently, contact and press the hose 33 into the groove 34 so as to firmly seat the hose conformingly in and against the rounded bottom of the groove and maintain the hose with little or no lateral rolling and waviness along its reach in the groove. Normally, only one radial adjustment of the intermediate axle 41 and its series of pulleys 46, 46 is required to accommodate hose 33 in a relatively wide range of sizes in the grooves 34, 34 without objectionable flattening of the hose, and to provide sufficient tension of the belts 47, 47 to resist slippage of the hose relative to the drum 27.

The yieldable pressing of the lower reach of each V-belt compels the hose 33 to seat conformingly against the laterally curved bottom wall of the groove 34 throughout a substantial width of the hose. This advantageously provides greater than line contact of the hose 33 with the wall in the groove 34 and facilitates positively holding the hose against lateral rolling and waviness along the groove during the cutting of the hose into pieces of substantially uniform determinate length.

For guiding the hose 33, 33 initially into the grooves 34, 34 and further facilitating the maintenance of the hose in the grooves and the maintenance of the spaced relationship of the V-belts 47, 47 throughout the upper quadrant region of the drum, there is provided a plurality of guide vanes 48, 48 of thin sheet metal material overlying and spaced-apart axially of the drum and extending vertically and circumferentially desirably from the position of the upper shelf 19 to a position just beyond the series of pulleys 46, 46 on the upper axle 42. Each guide vane 48 at its inner side or edge conforms to the circumferential curvature of the drum 27 with the curved edge closely adjacent and immediately overlying the laterally curved top surface of the wall separating adjacent grooves 34, 34. Since the V-belt pulleys 46, 46 of each series on the respective axles 40, 41 and 42 are axially spaced-apart, the guide vanes 48 are arranged in the spaces between adjacent pulleys so as to avoid interfering with the free rotation thereof. The plurality of vertically disposed guide vanes 48, 48 may be suitably secured as by welding or otherwise to a metal mounting strip 49 suitably slotted to receive the vanes and attached to the upper shelf 19.

The guide vanes 48, 48 project horizontally beyond the upper series of V-belt pulleys 46, 46 and are secured to and partially overlie a horizontal, elongated, hose-supporting metal bar 50 disposed closely adjacent and coextensive with the drum 27 axially thereof. The bar 50 has laterally-extending, open-faced, generally U-shaped grooves 51, 51 arranged in continuation of and in alignment with the grooves 34, 34 of the drum. Thus, the hose 33 during its advancement about the drum 27, moves beyond the grooves 34, 34 and V-belts 47, 47 at the upper series of pulleys 46, 46 and then moves tangentially of the drum along the grooves 51, 51 of the horizontal hose-supporting bar 50 without objectionable bending in any direction by virtue of the continuity of support provided by the hose-supporting bar. The hose-supporting bar 50 intermediate its width has a suitable knife-receiving slot 52 extending continuously lengthwise of the bar throughout its length and to a depth below that of the grooves 51, 51 in the bar. The slot 52 is at and constitutes the cutting position of the apparatus.

Indexing mechanism

The indexing mechanism 23 is directly connected to the rotatable hose-supporting means 21 by means of the one-piece drive shaft 28 which extends horizontally beyond the inner bearing mounting 31 toward the other end of the framework 15 and is supported for rotation at its other end by a vertically disposed roller bearing pedestal mounting 53 and metal support bracket 53a assembly suitably secured as by bolt fasteners to the upper shelf 19. A pair of axially spaced-apart over-running clutches 54, 55 are mounted on the drive shaft 28 intermediate the bearing mounting 31 and the support bracket 53a, as shown especially in Figs. 1 and 3. The clutch 54 may be of the inner and outer shell, multiple cam and ball engagement type, and has its inner shell keyed fixedly to the shaft 28, while the outer shell of the clutch 54 is attached fixedly to the support bracket 53a. When the shaft 28 is rotated to drive the drum 27 in the clockwise direction (indicated by the arrow 27a in Fig. 2) to advance the hose, the over-running clutch 54 is in the disengaged, free-running condition; but rotation of the drive shaft 28 and its associated drum 27 in the counter-clockwise direction immediately engages the clutch 54 to prevent effectively counter-clockwise rotation of the shaft and drum as a unit, that is the clutch 54 eliminates objectionable backlash of the drum to maintain the desired extent of clockwise rotation of the drum required to advance the hose a determinate extent beyond the cutting position at 52.

The over-running clutch 55 which is similar in construction to the clutch 54, has its inner shell keyed fixedly to the drive shaft 28, while the outer shell of the clutch 55 is attached fixedly to a vertically positioned pinion gear 56 mounted on the shaft 28 for rotation relative to the latter. Under initial rotation of the pinion gear 56 in the clockwise direction (27a), the clutch 55 is immediately engaged and drives both the shaft 28 and drum 27 clockwise. However, initial counter-clockwise rotation of the pinion gear 56 immediately disengages the clutch 55. Thus, the over-running clutches 54 and 55 coact to rotate the drive shaft 28 and drum 27 positively in the clockwise direction (27a), but prevent effectively objectionable backlash and counter-clockwise rotation of the drive shaft and drum immediately upon cessation of clockwise rotation of the pinion gear 56.

A vertical rack 57 which meshes with the gear 56, is fixedly secured to a vertically disposed guide plate 58 having spaced-apart, parallel, tubular side portions 59, 60 with suitable ball or roller bearings therein (not shown) mounted slidably on spaced-apart vertically disposed, parallel guide posts 61, 62 which are fixedly attached to the intermediate shelf 18 and to the top cover 20 as by socket fittings 63, 63. The upper shelf 19 is cut away to accommodate the rack 57, guide plate 58 and guide posts 61, 62 for permitting vertical reciprocating movement of the guide plate 58 and rack 57 axially along the guide posts, whereby the pinion gear 56 is compelled to rotate clockwise and counter-clockwise.

The guide plate 58 is connected to an adjustable-throw crank 64 by a connecting rod 65 pivotally and rotatably attached at its tubular upper end porton 65a to a forked extension 58a of the guide plate 58. The adjustable-throw crank 64 may be of longitudinally slotted construction with an axially or outwardly projecting member 66 mounted slidably in the slot and securely clamped to the crank 64 at the desired radial position as by a nut fastener 67 and metal clamping plate element 68. An adjusting screw 66a threadedly engages an apertured, interiorly threaded, end portion 64a of the crank and extends along and within the slot to establish the radial position of the member 66 to which the tubular lower end portion 65b of the connecting rod 65 is pivotally and rotatably attached. The arrangement facilitates adjustment of the extent of vertical reciprocating travel or movement of the rack 57 by virtue of adjusting the radial position of the member 66 relative to the axis of rotation of the crank 64, whereby the determinate extent of clockwise rotation of the drum 27 and hence the determinate advancement of the hose are established.

The crank 64 is suitably secured fixedly to and mounted for rotation with a shaft 69 of a speed reducer 70 mounted on the lower shelf 17. The speed reducer is driven by a V-belt and pulley drive assembly 71 connected to an electric motor 72 which is connected to a suitable source of electrical power (not shown) and normally continuously operated and is mounted on the intermediate shelf 18 which is cut away to accommodate the passage of the V-belt of the drive assembly 71 and the rotation of the connecting rod 65 with the adjustable-throw crank 64.

Hose-cutter means

The hose-cutter means 24 of knife assembly is arranged to the rear and above the drum 27, as shown especially in Figs. 1, 2 and 3, and adapted to be reciprocated horizontally and longitudinally of the framework 15 in a path substantially parallel to the axis of the rotation of the drum 27. The knife assembly 24 includes a stiff metal frame 73 of inverted U-shape having an electric motor 74 mounted between the legs of the U and connected to a suitable source of electrical power and normally continuously operated for continuously driving a rotating cutter or knife 75 by means of a V-belt 76 and pulley 77, 78 assembly. The pulley 78 is mounted fixedly on a motor shaft 79 and the pulley 77 is mounted fixedly on an end portion of a shaft 80 which carries at its other end the rotating knife 75. The shaft 80 is mounted rotatably on roller bearings (not shown) in a metal tubular quill 81 secured fixedly in a steel, split, hollow holder 82, which extends below the motor 74 across the open-end of the U-shaped frame and is fixedly attached to end portions of the legs of the U-shaped frame 73. The knife 75 is detachably mounted on the shaft 80 as by suitable spline and nut fastener and washer means 83 for rotation with the shaft. The knife 75 may be of the disc type having a wavy peripheral contour with a sharp cutting edge continuously around the periphery, as shown especially in Fig. 1. The knife 75 is arranged for rotation in a perpendicular plane passing centrally along the cutting slot 52 of the hose-supporting bar 50.

The knife assembly 24 has reciprocating movement substantially parallel to the cutting slot 52 and axis of rotation of the drive shaft 28 and drum 27, the extent of travel in each horizontal direction being sufficient to move the rotatable knife 75 from a position beyond one end of the hose-supporting bar 50 along the full length of the drum 27 to a position beyond the other end of the bar 50, whereby the knife 75 will cut or sever all the strips of hose 33, 33 supported by the drum 27 and bar 50. One limit of travel of the knife assembly 24 is shown in full lines in Fig. 1 and the other limit of travel of the knife assembly 24 is shown in broken lines in Fig. 1. The knife 75 may be lubricated or wetted with water or kerosene or other suitable liquid contained in a longitudinally-slitted, felt wiping pad 84 mounted in a suitable metal liquid-tight container 84a and positioned with the slit of the pad 84 in alignment with the slot 52 at one end of the hose-supporting bar 50, the container 84a being suitably secured to the end frame 35.

The U-shaped frame 73 of the knife assembly 24 is provided with elongated tubular roller bushings 85, 86 secured to the flat bottom or base of the U and extending longitudinally of the framework 15 in spaced-apart parallel relation to one another and to the axis of rotation of the drum 27. The roller bushings 85, 86 are disposed below the top cover 20 with spaced-apart, parallel metal guide rods 87, 88 extending through them along the framework 15 and having sufficient length to accommodate the travel of the knife assembly 24 within the required limits. The guide rods 87, 88 at their respective ends are carried and supported by mounting plates 89 and 90 extending laterally of the framework 15 and secured to the same as by welding or bolting to the top cover 20.

The top cover 20 has a relatively wide slot therein extending longitudinally of the framework 15 to accommodate the passage and reciprocating movement of a post 91 secured fixedly to and projecting upwardly from the flat base of the U-shaped frame 73 of the knife assembly 24. The post 91 at its upper portion has an annular end of a connecting link 92 attached and rotatably connected thereto. The connecting link 92 at its other annular end is attached and rotatably connected in superimposed relation to an annular end of a second connecting link 93 which has its other annular end secured fixedly to a vertical drive shaft 94 for full circle rotation therewith.

For each 180° of rotation in one direction of the shaft 94, the linkage mechanism 92, 93 produces horizontal travel in one direction of the knife assembly 24 from one limit to the other limit of travel so that 360° of rotation of the shaft 94 results in one complete cycle of reciprocation of the knife assembly axially of the drum 27. With the linkage mechanism 92, 93 and knife assembly 24 in the position shown in full lines in Fig. 1, initial rotation of the shaft 94 and link 93 through 180° produces sliding of the knife assembly 24 along the guide rods 87, 88 to the position shown in broken lines in Fig. 1, and the next succeeding 180° rotation of the shaft 94 and link 93 returns the linkage mechanism 92, 93 and knife assembly 24 to the position shown in full lines in Fig. 1.

The construction and arrangement of the knife assembly 24 and its associated mounting and linkage mechanism assures positive reciprocation of the knife assembly 24 with little or no lateral vibratory movement thereof, while maintaining straight line movement of the rotatable knife 75 in the slot 52 and axially parallel to the drum 27, thus advantageously facilitating the provision of regular or square-cut ends of the hose 33, 33.

The vertical drive shaft 94 which projects through and above the top cover 20, is rotatively mounted in and supported by suitable bearing fittings 95, 95 attached to the top cover 20 and to the upper shelf 19 at positions spaced rearwardly from the guide post 62.

A large gear 96 is fixedly secured as by keying to the vertical drive shaft 94 at a position spaced from and above the upper shelf 19 for direct rotation with the shaft, and meshes with a smaller gear 97 fixedly secured as by keying to the upper part of a divided drive shaft 98 extending vertically downward from the top cover 20 through the upper shelf 19 to the intermediate shelf 18. The divided shaft 98 is mounted rotatively in suitable bearing fittings 95, 95 secured to the top cover 20 and the intermediate shelf 18. The gears 96 and 97 constitute a gear drive having a 2 to 1 ratio so that 360° of rotation or a single revolution of the gear 97 produces only 180° of rotation or one-half revolution of the gear 96.

The upper shelf 19 is cut out to accommodate a single revolution clutch 99 mounted on the divided drive shaft 98 at the upper shelf 19, which single revolution clutch 99 at its upper end has a locking cam 100 contacting a solenoid-actuated follower 101 normally urged toward the cam 100 by a tension spring 101a secured at one end to the shelf 19. The drive shaft 98 is divided at the single revolution clutch 99 so that one part of the clutch 99 is fixedly secured to the upper part of the shaft 98 and the other part of the clutch 99 is secured to the lower part of the shaft 98, whereby the 2:1 gear drive 96, 97 is rotatively operated only when the clutch 99 is in the engaged condition, but the lower part of the shaft 98 is free to rotate all the time.

A chain and toothed pulley mechanism 102 drivingly connects the lower part of the divided shaft 98 to a suitable speed reducer 103 mounted on the intermediate shelf 18 and driven by the electric motor 72 by means of a suitable V-belt 104 and pulley 105 mechanism. The arrangement provides for continuous rotation at substantially constant speed of the lower part of the divided shaft 98, while the upper part of the divided shaft 98 and its associated gear 97 is rotated only when the single revolution clutch 99 is in the engaged condition to produce the required 180° of rotation of the drive shaft 94 and the horizontal movement of the knife assembly 24 from one limit to the other limit of its travel.

Control mechanism

The means 26, preferably of the electrical type, is provided for controlling sequential operation of the hose-supporting means 21 relative to the hose-cutter means 24, so that reciprocatory movement of the knife assembly 24 is effected only when the drum 27 is stationary and occurs only during, for example, the down stroke of the rack 57 and adjustable-throw crank 64. The electrical means 26 includes the locking cam 100 and spring-urged follower 101 connected mechanically and directly to the actuating plunger of a solenoid 106 on the upper shelf 19 adjacent the single revolution clutch 99. The solenoid 106 which functions to pull the follower 101 radially outward from the cam 100 to permit one revolution of the cam, is electrically connected to a micro-switch 107 which is electrically connected to a suitable source of electrical power. The switch 107 is mounted on the framework 15 below the intermediate shelf 18 and positively actuated by a cam 108 on an extension of the shaft 69 of the speed reducer 70 and by a roller type follower 109 riding on the cam 108 and connecting mechanically to the mechanism of the limit switch 107.

Operation

In the operation of the apparatus the continuously operated motor 72 drives the speed reducer 70 which rotates the adjustable-throw crank 64 so that on the forward stroke of the crank the connecting rod 65 compels vertical upward movement of the rack 57, thus rotating the pinion gear 56 clockwise. This disengages the overrunning clutch 54 and engages the overrunning clutch 55 to compel corresponding rotation of the horizontal drive shaft 28 and drum 27 until the upward movement of the rack 57 has ceased, thereby rotating the drum clockwise a determinate extent to produce advancement of the hose 33, 33 a determinate extent beyond the cutting position at the slot 52 of the hose-supporting bar 50. At the start of the back stroke of the crank 64 for effecting the downward movement of the rack 57 and the counter-clockwise rotation of the pinion gear 56, the overrunning clutch 55 disengages to permit counter-clockwise rotation of the pinion gear 56, while at the same time the overrunning clutch 54 engages and prevents effectively back-lash and counter-clockwise rotation of the horizontal drive shaft 28 and drum 27.

When the forward stroke of the crank 64 and upward movement of the rack 57 have ceased, the cam 108 and follower 109 makes the electrical circuit through the switch 107 thus energizing the solenoid 106 to pull the follower 101 outwardly of the locking cam 100 sufficiently to permit the rotative engagement of the single revolution clutch 99 for compelling rotation of the upper part of the vertical drive shaft 98 and its associated gear 97 throughout 360° by virtue of the operation of the speed reducer 103 and chain drive mechanism 102 connected to the lower part of the drive shaft 98. At the conclusion of a single revolution of the clutch 99, the solenoid 106, locking cam 100 and follower 101 coact to disengage the clutch 99, whereby it ceases driving the upper part of the divided drive shaft 98.

By virtue of the 2:1 ratio of the gears 96 and 97, the drive shaft 94 is rotated 180° thereby actuating the linkage mechanism 92, 93 to produce horizontal movement of the knife assembly 24 from one limit of its travel to the other limit of its travel. This movement of the knife assembly 24 carries the continuously rotating knife 75 smoothly and with little or no lateral vibration along the cutting slot 52 in the hose-supporting bar 50 throughout the entire length thereof to sever completely and squarely or regularly each of the strips of hose 33, 33, while they are supported in the grooves 51 of the bar 50, thereby cutting off the advanced portion of each strip of hose 33 and producing precision-cut pieces of hose of substantially uniform determinate length. The cut pieces are free to fall into a suitable receptacle (not shown) provided for the purpose and carried by the framework 15, if desired.

Upon cessation of the back stroke of the crank 64 and the downward movement of the rack 57, the switch 107 is actuated by the cam 108 and follower 109 to break the electric circuit and de-energize the solenoid 106, thus permitting spring-urged follower 101 to lock the cam 100 so as to disengage the single revolution clutch 99 and stop rotation of the gear 97 to hold the knife assembly 24 at one of its limits of travel.

As soon as the crank 64 starts its forward stroke initiating the upward movement of the rack 57, the overrunning clutch 54 disengages while the other overrunning clutch 55 engages so that clockwise rotation of the pinion gear 56, produced by the upward movement of the rack 57, results in determinate clockwise rotation of the drum 27. Under such rotation of the drum, the V-belts 47, 47 at their lower reaches between the upper and lower series of pulleys 46, 46 frictionally contact and yieldably press the hose 33, 33 conformingly against the bottom of the grooves in the drum 27 so as to resist lateral rolling and waviness of the strips of hose in the grooves 34, 34 and to compel the determinate advancement of the strips of hose about the grooves 34, 34 in the drum and along the grooves 51 in the hose-supporting bar 50. It will be noted that adjustment of the throw of the crank 64 establishes the extent of upward movement of the rack 57 and in turn the extent of rotation of the pinion gear 56, whereby the extent of rotative movement of of the drum 27 is adjusted to provide the desired advancement of the strips of hose 33, 33 to a determinate extent for producing uniformly cut pieces of hose of determinate length.

The apparatus described hereinabove will automatically cut pieces of the desired determinate length from one or a plurality of strips of hose 33, 33 which are automatically advanced about the drum 27 to a determinate extent and automatically cut off under reciprocating movement of the knife assembly 24 and rotation of the knife 75. The reciprocating movement of the knife assembly is effected as described hereinabove and controlled in a sequential manner relative to rotation of the drum, preferably by the electrical control means described and shown although not necessarily limited thereto.

Modified structures

The modified construction shown in Fig. 7, as compared to the rotatable hose-supporting means 21 including yieldable hold-down means 22 shown in Figs. 1 to 6, inclusive, has a different yieldable hold-down means 110 and a different hose-supporting bar 111 and does not require the supplemental guide bars 48, 48. The yieldable hold-down means 110 includes a pair of circumferentially spaced-apart, continuous rollers 112, 113 of yieldable material at least coextensive with the drum 27 and arranged substantially parallel to the axis of rotation of the drive shaft 28 and the peripheral supporting surface of the drum 27, the rollers 112, 113 being positioned adjacent the grooved periphery of the drum and at the upper and lower limits of the frontal upper quadrant region of the drum. The rollers are mounted on stiff metal axles 114, 114 for rotation therewith, which axles may be rotatively supported by the end plates 35, 36, and only the lower roller 113 and axle 114 assembly is, if desired, adjustable radially of the drum 27 for accommodating various sizes of hose 33.

Each roller may be made of molded resilient rubber and has axially spaced-apart, circumferentially-extending, shallow, continuous channels 115 for accommodating the rounded top portions of the walls separating adjacent grooves 34, 34. The non-adjustable upper roller 112 has the rounded top portions of the separating walls seated partially and continuously in its channels 115. The lower roller 113 is adjusted radially to yieldably contact the hose; consequently the rounded top portions of the separating walls may or may not seat in the channels 115 of roller 113 for the larger size hose 33a, but do seat in the channels 115 for the smaller size hose 33b.

A thin, smooth metal plate 116 of curved section extends circumferentially between the rollers 112, 113 in conformance to the curvature of the grooved periphery of the drum 27 and is coextensive with the axial length of the drum 27. The curved plate 116 at its lower side margin is supported pivotally at 117 by the end plates 35, 36 and is adjustable radially with the lower roll 113. For maintaining the curved plate 116 yieldably pressed against the hose 33 about the upper quadrant region of the drum 27, there is provided a compression spring structure 118 carried by the end plates 35, 36 and arranged to resiliently press the curved plate 116 toward the grooves 34, 34 in the drum 27. This provides for continuity of contact by the plate 116 with the hose between the upper and lower rollers to resist lateral rolling and waviness of the hose during its advancement about the drum. The resilient rollers 112 and 113 also contact the hose and coact with the curved plate 116 and drum 27 to resist slippage of the hose in the grooves and to facilitate the advancement of the strips of hose to a determinate extent beyond the cutting position at 119.

The hose-supporting bar 111 has a cutting slot 119 extending along the same substantially parallel to the axis of rotation of the drum 27 for receiving the rotating knife 75. The bar 111 has a series of longitudinally spaced-apart, laterally-extending openings bored therein, rather than the open-faced grooves of the bar 50, so as to enclose fully the strips of hose extending beyond the upper roller 112 and drum 27. The bored openings in the bar 111 are aligned with the grooves 34, 34 in the drum and are of uniform diameter to accommodate one size of the hose. A plurality of bored and slotted hose-supporting bars 111 are required for a plurality of sizes of the hose.

The modified construction shown in Fig. 8 differs from the rotatable hose-supporting means 21 including the yieldable hold-down means 22 shown in Figs. 1 to 6, inclusive, in that a cylindrical drum 120 has not only the series of circumferentially-extending, continuous grooves 34, 34 but is provided with a plurality of circumferentially spaced-apart, cutting slots 121, 121 having a depth greater than that of the grooves 34 and extending substantially parallel one to the other and to the axis of rotation of the drum 120 continuously along the length thereof. The rotating knife 75 traverses the respective slots 121, 121 to cut off pieces of hose of determinate length subsequent to clockwise rotation of the drum 120, and no slotted hose-supporting bar is required.

The yieldable hold-down means 122 includes a pair of circumferentially spaced-apart rollers 123, 124 of wood or like material positioned at the frontal upper quadrant region of the drum 120 and supported rotatively by the end plates 35, 36. Preferably, the lower roller 124 is adjustable radially and the upper roller 123 is non-adjustable.

An endless, thin, resilient rubber band 125 which is coextensive with the drum and rollers, extends about the rollers 123, 124 with its lower reach 126 resiliently flexed into conformance with and pressed toward the grooved periphery of the drum 120. The endless band 125 at its lower reach 126 maintains by virtue of its extensive flexibility and resiliency, continuity of yieldable, frictional contact throughout ts length with each of the strips of hose 33, 33 in the grooves 34, 34 of the drum 120, even though there be slight variation in size of adjacent strips of hose 33, and effectively avoids bridging between spaced-apart strips of hose of relatively larger size than that of an intermediate strip of hose. Thus, the endless band maintains individual, yielding, frictional contact against all the strips of hose 33, 33 in the grooves 34, 34, thereby resisting slippage, lateral rolling and waviness of the strips, and in this respect functions much like the series of V-belts 47, 47 in the embodiment shown in Figs. 1 to 6.

It has been found that an all-rubber endless band is advantageous especially for automatically cutting strips of all-rubber tubing of small diameter such, for example, as thin-walled, latex tubing generally known as surgical tubing having an outside diameter of about ¼ inch. The construction and arrangement shown in Fig. 8 produces automatic advancement of strips of surgical tubing and the like to a determinate extent, and precision-cutting of the surgical tubing into pieces of substantially uniform determinate length at a high rate or number of pieces for each hour with a minimum number of rejects.

It will be noted that the cutting slots 121, 121 are uniformly spaced-apart circumferentially of the drum 120. When pieces of relatively greater or lesser length than that shown in Fig. 8 are to be cut, other drums with the desired spacing between slots are generally required. The apparatus described hereinabove must be adjusted so that the cutting knife 75 will traverse the cutting slots 121, 121 in sequence and in accordance with the rotation of the drum 120 and advancement of the strips of hose 33, 33.

The invention makes feasible commercial production of cut pieces of flexible hose or tubing having uniformity of length and regular or square-cut ends, and the automatic production of a high number of cut pieces per hour at low cost without objectionable loss of finished hose or tubing because of irregular lengths and ends of the cut pieces, and with a minimum of attention by the operator in producing the pieces of hose or tubing of substantially uniform determinate length.

Variations may be made without departing from the scope of the invention as it is defined in the following claims:

I claim:

1. Apparatus for feeding and cutting an elongate rod-like strip of flexible highly deformable material to provide substantially uniform determinate cut-lengths thereof, said apparatus comprising a rotatable support having a circumferentially-grooved longitudinally-slotted cylindrical surface for receiving and supporting the flexible strip in a groove thereof, means for rotating said support about its axis in substantially equal successive angular movements to advance the flexible strip therewith, a cutter movable across the path of the flexible strip and also movable longitudinally across the circumferentially-grooved cylindrical surface between movements thereof for severing the flexible strip, said cutter extending into a longitudinal slot in said cylindrical surface while moving across the same to sever the strip in said groove, means for moving said cutter in sequence to said angular movements of said support, an endless flexible pressure member adjacent said support for movement therewith, means mounting said pressure member for rotation thereof and in a manner to present a free-floating reach thereof adjacent said cylindrical surface of said support and extending substantially conformingly about said cylindrical surface throughout a substantial arcuate extent thereof to a position therein adjacent the path of said cutter for lightly and resiliently pressing the flexible strip against the wall in said groove in said support.

2. Apparatus for feeding and cutting an elongate rod-like strip of flexible highly deformable rubber-like material to provide substantially uniform determinate cut-lengths thereof, said apparatus comprising a rotatable support for the flexible strip, means for rotating said support about its axis in substantially equal successive angular movements to advance the flexible strip therewith, a cutter for severing the flexible strip and movable across the path of the flexible strip and also movable across the peripheral surface of said support at a cutting position spaced radially from the peripheral surface of said support and located to one side of a vertical plane extending along and intersecting said axis of the support, means for moving said cutter in a reciprocating manner across said peripheral surface and at said cutting position in sequence to said angular movements of said support, means to each side of said cutting position for maintaining the flexible strip in a substantially straight normally shaped condition at said cutting position, a yielding pressure member adjacent said support in proximity to said cutting position, and means mounting said pressure member in a manner to present a free-floating pressing face adjacent said peripheral surface of said support and extending substantially conformingly about said peripheral surface to a position therein adjacent and spaced from said cutting position for lightly and resiliently pressing the flexible strip against said support.

3. Apparatus for feeding and cutting a plurality of elongate tubular strips of flexible highly deformable rubber-like material to provide substantially uniform determinate cut-lengths thereof, said apparatus comprising a rotatable support having a peripherally-extending surface with a plurality of peripherally-extending grooves therein for receiving and supporting the plurality of flexible strips each in a groove of said surface, means for rotating said support about its axis in substantially equal successive angular movements to advance all the flexible strips therewith, a cutter movable across the paths of the flexible strips and also across and in proximity to the peripherally-grooved surface of said support between movements thereof for severing all the flexible strips, means for moving said cutter in a reciprocating manner across said peripheral surface in sequence to said angular movements of said support, a plurality of yielding pressure members each adjacent said support in overlying relation to a peripheral groove therein, and means mounting said pressure members each in a manner to present a free-floating pressing face adjacent and overlying a peripheral groove in said surface of said support and extending partially about the peripherally-grooved surface to a position therein adjacent the path of said cutter for lightly and resiliently pressing a flexible tubular strip against the wall in a peripheral groove of said support.

4. Apparatus for feeding and cutting a plurality of elongate tubular strips of flexible highly deformable rubber-like material to provide substantially uniform determinate cut-lengths thereof, said apparatus comprising a rotatable support having a peripherally-grooved peripheral surface for the flexible strips, means for rotating said support about its axis in substantially equal successive angular movements to advance all the flexible strips therewith, a cutter movable across the paths of the flexible strips and also across and in proximity to the peripheral surface of said support between movements thereof for severing all the flexible strips, means for moving said cutter in a reciprocating manner across said peripheral surface in sequence to said angular movements of said support, a plurality of endless flexible pressure members adjacent said support for movement therewith, means mounting said pressure members for rotation thereof and each in a manner to present a free-floating reach adjacent and overlying a peripheral groove in said peripheral surface of said support and extending about said peripheral surface throughout a substantial arcuate extent thereof to a position therein adjacent the path of said cutter for lightly and resiliently pressing a flexible tubular strip against the wall in a peripheral groove of said support, and means adjacent said support to each side of the path of said cutter for maintaining each flexible tubular strip in a straight normally shaped condition for severance thereof.

5. Apparatus for feeding and cutting a plurality of elongate tubular strips of flexible highly deformable rubber-like material to provide substantially uniform determinate cut-lengths thereof, said apparatus comprising a rotatable support having a peripheral surface with peripherally-extendnig side-by-side grooves therein for receiving and supporting the plurality of flexible strips each in a groove of said surface, means for rotating said support about its axis in substantially equal successive angular movements to advance all the flexible strips therewith, cutting means including a rotatable generally circular cutter movable across the paths of the flexible strips and also movable across and in proximity to and spaced radially from said peripheral surface of said support for severing all the flexible strips, means for moving said cutter in a reciprocating manner across said peripheral surface in sequence to said angular movements of said support, a longitudinally-slotted laterally-grooved elongate member for supporting the flexible strips and mounted adjacent and extending across said peripheral surface of said support with the lateral grooves in continuation of the peripheral grooves in said surface and with its slot at and extending along the path of the cutter to accommodate the cutter therein, a plurality of endless flexible belts of trapezoidal cross section constituting yielding pressure members in side-by-side relation adjacent said support for movement therewith, and means mounting said flexible belts for rotation thereof and each in a manner to present a free-floating reach thereof adjacent and overlying a peripheral groove in said peripheral surface of said support and extending about said peripheral surface throughout a substantial arcuate extent thereof to a position therein adjacent the laterally-grooved elongate member and spaced from the path of said cutter for lightly and resiliently pressing a flexible tubular strip against the wall in a groove in said peripheral surface of the support.

6. Apparatus as defined in claim 5 in which said peripheral surface of said rotatable support has a cylindrical configuration of uniform diameter, and said peripheral grooves are each circumferentially continuous and generally U-shaped in cross-section and of a width at the opening of the U at least equal to the width of said each belt and of an overall depth sufficient to accommodate the major portion of the depth of the flexible strip; and in which said cutter is rotatable and said cutting means includes means for rotating said cutter.

7. Apparatus as defined in claim 5 in which said rotatable support is a cylindrical drum having said peripheral surface of uniform diameter and said grooves therein of generally U-shape form in cross-section, each groove being of a width at the opening of the U greater than the width of said each belt and of an overall depth sufficient to accommodate the major portion of the depth of the flexible strip, and each groove in cross-section being rounded at the bottom of the U and having laterally outward divergent sides at the legs of the U.

8. Apparatus as defined in claim 5 in which said means for rotating said support includes electrical motor driving means associated with overrunning clutch means having a driving connection with said support, and in which said means for moving said cutter includes electrically driven gear and linkage means connected to said cutting means and control means cooperating with said gear and linkage means to operate the same in sequence to said angular movements of said support.

9. Apparatus for feeding and cutting an elongate rod-like strip of flexible highly deformable material to provide substantially uniform determinate cut-lengths thereof, said apparatus comprising support means providing a cutting position and including strip-supporting portions spaced-apart at said cutting position for laterally engaging the flexible rod-like strip at spaced zones thereof adjoining said cutting position to prevent lateral displacement and maintain the normal shape of the said strip, said support means including a rotatable member for supporting the flexible rod-like strip on and partially about the peripheral surface of said member and means for laterally engaging the said strip along its member-supported extent to prevent lateral displacement thereof, means for rotating said member about its axis of rotation in substantially equal successive angular movements to advance the flexible rod-like strip with said member and along both said portions, a cutter movable in the space between said strip-supporting portions at said cutting position, means for moving said cutter in said space in sequence to said angular movements of said rotatable member for severing the said strip while it is supported and laterally engaged by both said portions, yielding pressure means including an arcuate portion adjacent said rotatable member and said strip-supporting portions, and means mounting said yielding pressure means with said arcuate portion extending concentric with and partially about and overlying the peripheral surface of said rotatable member for lightly and resiliently pressing the flexible rod-like strip against said peripheral surface of said rotatable member.

10. Apparatus for feeding and cutting an elongate rod-like strip of flexibile highly deformable material to provide substantially uniform determinate cut-lengths thereof, said apparatus comprising support means providing a cutting position and including a rotatable member for supporting the flexible rod-like strip on and partially about the peripheral surface of said member and including means for laterally engaging the flexible rod-like strip along its member-supported extent to prevent lateral displacement thereof, means for rotating said member about its axis of rotation in substantially equal successive angular movements to advance the flexible rod-like strip with said member and to said cutting position, a cutter movably mounted at said cutting position, means for moving said cutter at said cutting position in a direction along said axis of rotation of the member and laterally across the said strip in sequence to said angular movements of the rotatable member for severing the said strip, yielding pressure means including an arcuate portion adjacent said rotatable member and said cutting position, and means mounting said yielding pressure means with said arcuate portion extending concentric with and partially about and overlying the peripheral surface of said rotatable member for lightly and resiliently pressing the flexible rod-like strip against said peripheral surface of said rotatable member.

11. Apparatus for feeding and cutting an elongate rod-like strip of flexible highly deformable material to provide substantially uniform determinate cut-lengths thereof, said apparatus comprising support means including a circumferentially grooved rotatable member providing at least one continuous groove for accommodating the flexible rod-like strip therein and partially about said member with the wall in said groove laterally engaging the said strip on opposite sides thereof to prevent lateral displacement thereof, means for rotating said member about its axis of rotation in substantially equal successive angular movements to advance the flexible rod-like strip therewith, a cutter movable in a direction along the axis of rotation of said member and laterally across said groove, means for reciprocatingly moving said cutter in said direction laterally across said groove in sequence to said angular movements of said rotatable member for severing the said strip, yielding pressure means including an arcuate portion adjacent said rotatable member, and means mounting said yielding pressure means with said arcuate portion extending concentric with and partially about the grooved surface of said rotatable member in proximity to the latter said surface for lightly and resiliently pressing the flexible rod-like strip against said rotatable member and into said groove therein.

12. Apparatus for feeding and cutting an elongate rod-like strip of flexible highly deformable material to provide substantially uniform determinate cut-lengths thereof, said apparatus comprising support means including a circumferentially grooved rotatable member providing at least one continuous groove for accommodating the flexible rod-like strip therein and partially about said rotatable member with the wall in said groove laterally engaging the said strip at opposite sides thereof to prevent lateral displacement thereof along its member-supported extent, said support means including strip-supporting portions spaced-apart in the direction along said groove in alignment therewith for laterally engaging the flexible rod-like strip at opposite sides thereof and said support means providing a gap between said portions extending in a direction along the axis of rotation of said member and laterally across the said strip, means for rotating said member about said axis of rotation thereof in substantially equal successive angular movements to advance the flexible rod-like strip therewith and along both said portions, a cutter movable in said gap between said portions, means for reciprocatingly moving said cutter in and along said gap in said direction and across said groove in sequence to said angular movements of said rotatable member for severing the said strip while it is supported and laterally engaged by both said portions, yielding pressure means including an arcuate portion adjacent said rotatable member and spaced from said strip-supporting portions, and means mounting said yielding pressure means with said arcuate portion extending concentric with and partially about the grooved surface of said rotatable member in overlying relation to the latter said surface for lightly and resiliently pressing the flexible rod-like strip against said member and into said groove therein.

References Cited in the file of this patent

UNITED STATES PATENTS

| Number | Name | Date |
|---|---|---|
| 194,168 | Perkins | Aug. 14, 1877 |
| 827,674 | Thompson | July 31, 1906 |
| 2,137,724 | Lester et al. | Nov. 22, 1938 |
| 2,410,905 | Slusher | Nov. 12, 1946 |